(12) United States Patent
Heng et al.

(10) Patent No.: US 7,887,937 B2
(45) Date of Patent: Feb. 15, 2011

(54) THERMAL INSULATION ASSEMBLIES AND METHODS FOR FABRICATING THE SAME

(75) Inventors: Vann Heng, Buena Park, CA (US); Robert A. DiChiara, Jr., Carlsbad, CA (US); Elizabeth Chu, Mountain View, CA (US); Dave Zorger, Sun City, CA (US)

(73) Assignee: The Boeing Company, Chicago, IL (US)

( * ) Notice: Subject to any disclaimer, the term of this patent is extended or adjusted under 35 U.S.C. 154(b) by 793 days.

(21) Appl. No.: 11/737,115

(22) Filed: Apr. 18, 2007

(65) Prior Publication Data

US 2008/0176020 A1 Jul. 24, 2008

Related U.S. Application Data

(60) Provisional application No. 60/886,223, filed on Jan. 23, 2007.

(51) Int. Cl.
*B32B 9/00* (2006.01)
*B05D 3/02* (2006.01)

(52) U.S. Cl. .................. 428/702; 428/102; 427/189; 427/202; 427/372.2

(58) Field of Classification Search .............. 428/102, 428/702; 165/135, 136; 427/189, 202, 372.2
See application file for complete search history.

(56) References Cited

U.S. PATENT DOCUMENTS 5,626,951 A  5/1997 Hogenson

| 6,770,584 | B2 | 8/2004 | Barney et al. |
| 6,844,057 | B2 * | 1/2005 | DiChiara, Jr. ............... 428/325 |
| 6,969,546 | B2 | 11/2005 | DiChiara, Jr. |
| 2004/0033882 | A1 | 2/2004 | Barney et al. |
| 2005/0084665 | A1 | 4/2005 | DiChiara, Jr. |
| 2006/0019087 | A1 | 1/2006 | Mazzola et al. |

FOREIGN PATENT DOCUMENTS

EP     1645410 A2    4/2006

OTHER PUBLICATIONS

David Barthelmy, http://www.webmineral.com/data/Cordierite.shtml, 1997-2010.*
Vann Heng, Advanced Oxide Ceramic Matrix Composite for Durable Thermal Protection System, The 31st Annual Conference on Composites, Materials and Structures, Daytona Beach, FL, Jan. 22-25, 2007, pp. 1-26.
Vann Heng, Advanced Oxide Ceramic Matrix Composite for Durable Thermal Protection System, The 31st Annual Conference on Composites, Materials and Structures, Daytona Beach, FL, Jan. 22, 2007, pp. 1-26.

* cited by examiner

*Primary Examiner*—Gwendolyn Blackwell
(74) *Attorney, Agent, or Firm*—McNees Wallace & Nurick LLC

(57) ABSTRACT

Thermal insulation assemblies and methods for fabricating thermal insulation assemblies are provided. In an exemplary embodiment, a thermal insulation assembly comprises a ceramic tile having a surface coated with an alumina-mullite slurry. A ceramic matrix composite is disposed on the coated surface. The ceramic matrix composite comprises a first ply of a ceramic fiber impregnated with a ceramic matrix.

19 Claims, 4 Drawing Sheets

THERMAL INSULATION ASSEMBLIES AND METHODS FOR FABRICATING THE SAME

CROSS-REFERENCES TO RELATED APPLICATIONS

This application claims the benefit of U.S. Provisional Application No. 60/886,223, filed Jan. 23, 2007. This application relates to the subject matter described in: U.S. patent application Ser. No. 11/491,359 filed Jul. 21, 2006; U.S. patent application Ser. No. 11/134,876, filed May 23, 2005; and U.S. Pat. No. 6,969,546, issued Nov. 29, 2005. The content of these three patent documents are incorporated herein by reference.

STATEMENT REGARDING FEDERALLY SPONSORED RESEARCH OR DEVELOPMENT

This invention was made with government support under F33615-03-2-5202 awarded by the United States Air Force. The government has certain rights in this invention.

TECHNICAL FIELD

The embodiments described herein generally relate to insulation systems and methods for fabricating insulation systems, and more particularly relate to thermal insulation assemblies for extreme environments and methods for fabricating the same.

BACKGROUND

Ceramic tiles have long been the standard insulation to protect heat vulnerable regions of launch vehicles such as a Space Shuttle. Insulation materials such as LI900 or LI2200 (Lockheed®) Insulation), available from Lockheed Martin Corporation of Bethesda, Md., FRCI (fiber reinforced ceramic insulation), and AETB (alumina enhanced thermal barrier) commonly are used to manufacture ceramic tiles for thermal protection systems on space vehicles. In the past, the size of the tiles typically was about 15.24 cm (about 6 inches) by about 15.24 cm (about 6 inches) and typically had an outer surface protection layer that included reaction-cured glass (RCG). Subsequently, a coating commonly referred to as toughened unipiece fibrous insulation (TUFI) and similar coatings were developed and used in place of or in combination with RCG.

Many high temperature ceramic thermal insulation tiles currently used in extreme environments, such as environments to which space vehicles, such as the Space Shuttle, are exposed, are delicate and susceptible to impact damage. The areas of frequent impact damage on such vehicles include landing gear doors, carrier panels, body flaps, and perimeter tiles for leading edge and elevon cove. Often, tiles on these areas must be replaced because of either shrinking (also known as "slumping") from high heat or damage from debris.

Newer developmental programs for launch vehicles, aircraft engines, ground base turbines, and other instruments exposed to extreme environments would benefit from more durable high-temperature insulation surfaces as well as larger insulation pieces to achieve the advantages of fewer gaps and joints between the insulation pieces. The developmental programs also would be enhanced by insulation pieces with smoother and more durable surfaces that do not render chemical species at high temperatures. The rendering of chemical species at high temperatures adversely affects the heat flux, leading to overheating of the insulation pieces. It also is desirable for the insulation pieces to withstand temperatures of greater than about 1204° C. (about 2200° F.) without becoming substantially embrittled. In addition, low cost methods for fabricating such insulation pieces are needed.

Accordingly, it is desirable to provide thermal insulation assemblies that have smooth and durable surfaces and that can withstand temperatures of greater than about 1204° C. (about 2200° F.) without becoming substantially embrittled. In addition, it is desirable to provide low cost methods for fabricating such thermal insulation assemblies. Furthermore, other desirable features and characteristics of the thermal insulation assemblies and methods for fabricating the thermal insulation assemblies will become apparent from the subsequent detailed description and the appended claims, taken in conjunction with the accompanying drawings and the foregoing technical field and background.

BRIEF SUMMARY

A thermal insulation assembly in accordance with an exemplary embodiment is provided. The thermal insulation assembly comprises a ceramic tile having a surface coated with an alumina-mullite slurry. A ceramic matrix composite facesheet is disposed on the coated surface. The ceramic matrix composite facesheet comprises a first ply of a ceramic fiber impregnated with a ceramic matrix.

A method for fabricating a thermal insulation assembly in accordance with an exemplary embodiment is provided. The method comprises providing a machined ceramic tile having a surface. The surface of the ceramic tile is coated with an alumina-mullite slurry. A first ceramic matrix composite ply is prepared and applied overlying the coated surface of the ceramic tile. The first ceramic matrix composite ply is cured.

A method for thermally insulating a structure in accordance with an exemplary embodiment is provided. The method comprises providing a thermal insulation assembly. The thermal insulation assembly comprises a ceramic tile having a surface coated with an alumina-mullite slurry and a mullite-alumina-based ceramic matrix composite facesheet overlying the coated ceramic tile. The thermal insulation assembly is affixed to the structure.

BRIEF DESCRIPTION OF THE DRAWINGS

Various embodiments will hereinafter be described in conjunction with the following drawing figures, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Figure 1:
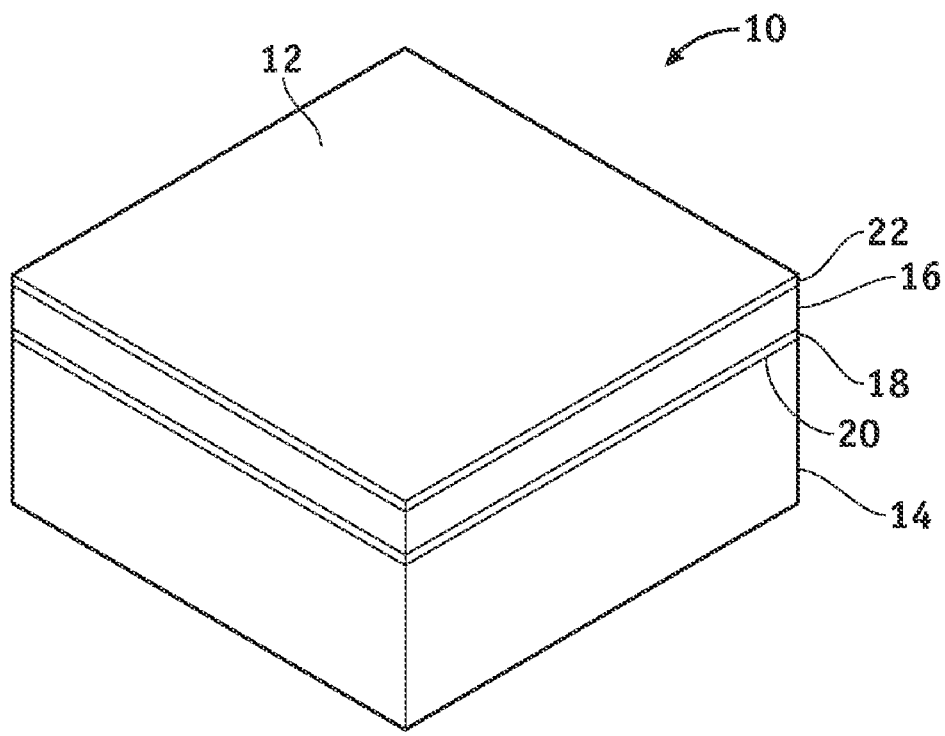
FIG. 1 is a isometric view of a thermal insulation assembly in accordance with an exemplary embodiment.

FIG. 1 is an isometric view of a thermal insulation assembly 10, in accordance with an exemplary embodiment, for use in extreme environments such as those environments to which launch vehicles, aircraft engines, ground-based turbines, and the like are exposed. The thermal insulation assembly 10 has a smooth and durable surface 12 and can withstand temperatures of greater than about 1204° C. (about 2200° F.) without becoming substantially embrittled. Thermal insulation assembly 10 comprises a ceramic tile 14. Ceramic tile 14 is an insulation material such as, for example, AETB or BRI (Boeing® Rigid Insulation), available from The Boeing Company of Chicago, Ill., and is machined in advance to a predetermined shape of any suitable size. A ceramic matrix composite (CMC) facesheet 16 overlies ceramic tile 14. CMCs are well suited to high temperature structural environments for aerospace and industrial applications. These materials are durable under a number of physically demanding conditions such as high temperature, corrosive conditions, and high acoustic environments. The CMC facesheet 16 provides wear protection, impact damage resistance, smoothness, and heat resistance to thermal insulation assembly 10.

An interface layer 18 is applied to a surface 20 of ceramic tile 14 and is interposed between the ceramic tile 14 and the CMC facesheet 16. The interface coating 18 is formed from a mullite ($3Al_2O_3.2SiO_2$)-alumina slurry that is applied to surface 20 of ceramic tile 14 and dried. The interface coating 18 penetrates the surface 20 creating a denser surface 20 of the ceramic tile 14, increasing the adhesion of the CMC facesheet 16, minimizing the penetration of the CMC facesheet into the tile 14, and improving the overall surface damage resistance. In an optional embodiment, thermal insulation assembly 10 further comprises an emissivity coating 22 disposed on the CMC facesheet 16 to increase the surface emissivity of assembly 10.

In one exemplary embodiment, the CMC facesheet 16 is an oxide CMC. Oxide CMCs are economic, low dielectric, thermally stable, structural ceramic systems. Oxide CMCs comprise a ceramic matrix that is reinforced with one or more types of fibers such as quartz fibers, alumina fibers, and others. The fibers may be provided in the form of a tape or a ceramic fabric such as 4, 5, or 8 harness satin fabric, plan weave fabric, crawfoot satin fabric, and braided fabric. The fibers are chosen for their strength, maximum temperature capability, dielectric properties, and, as discussed in more detail below, their thermal expansion match to the underlying ceramic insulation.

In another exemplary embodiment, the oxide CMC facesheet 16 is a mullite-alumina-based CMC facesheet. The mullite-alumina-based CMC facesheet comprises a mullite-alumina ceramic matrix impregnating a ceramic fiber. The mullite-alumina ceramic matrix is formed from a mullite-alumina powder mixture and an alumina precursor solution. The mullite-alumina-based CMC facesheet exhibits thermal and structural stability at temperatures beyond 1204° C. (about 2200° F.). It has higher temperature resilience, improved damage resistance, and less susceptibility to becoming embrittled at temperatures exceeding 1204° C. (about 2200° F.) compared to other oxide CMCs.

The mullite-alumina-based thermal insulation assembly 10 has many potential applications, especially for harsh environments, including spacecraft, aircraft and missiles. The potential applications include the Space Shuttle, new re-entry space vehicles, aircraft-, missile-, and ground-based turbines, and other structures using or exposed to extreme environments. Mullite and alumina powders are both high-temperature materials that do not sinter readily at temperatures above about 1093° C. (about 2000° F.), thus preventing strong bonding to the ceramic fibers or even to themselves. In the mullite-alumina-based CMC facesheet 16, the mullite-alumina-based matrix is porous and, therefore, the matrix and fibers have a weak interface. This weak interface deflects the cracks and distributes the load to other fibers, causing the cracks to absorb energy. This is an ideal fracture mechanism needed for CMC facesheets to achieve higher toughness and to improve strength and stability.

Figure 4:
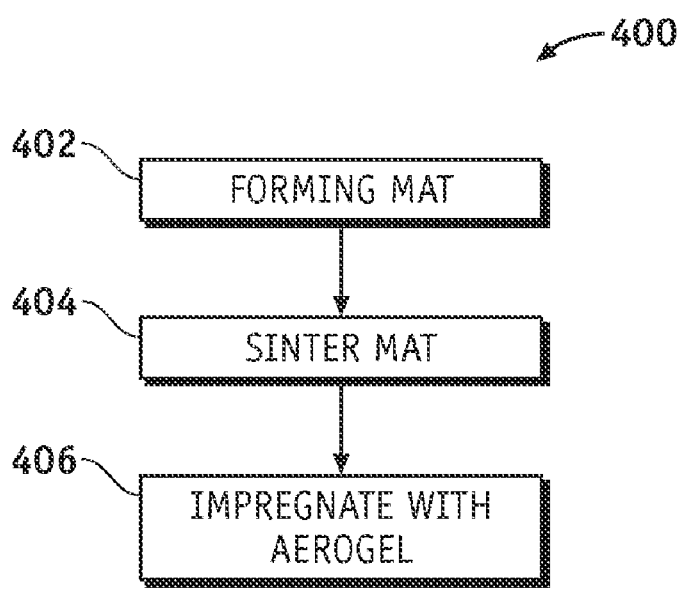
FIG. 4 is a flow chart illustrating a method for fabricating a mullite-alumina ceramic matrix.
Figure 2:
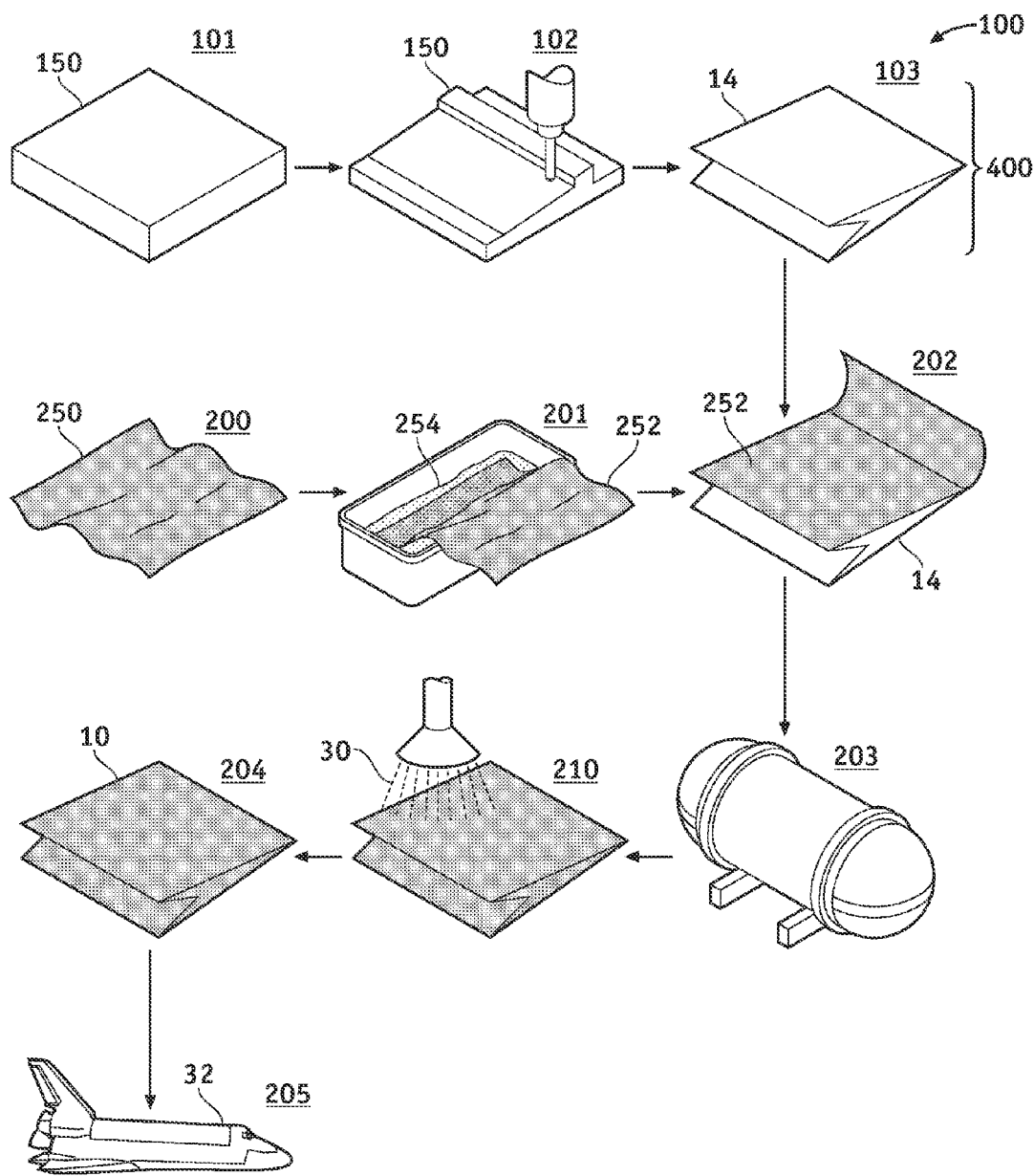
FIG. 2 is a flow diagram illustrating a method for fabricating a thermal insulation assembly in accordance with an exemplary embodiment.
Figure 3:
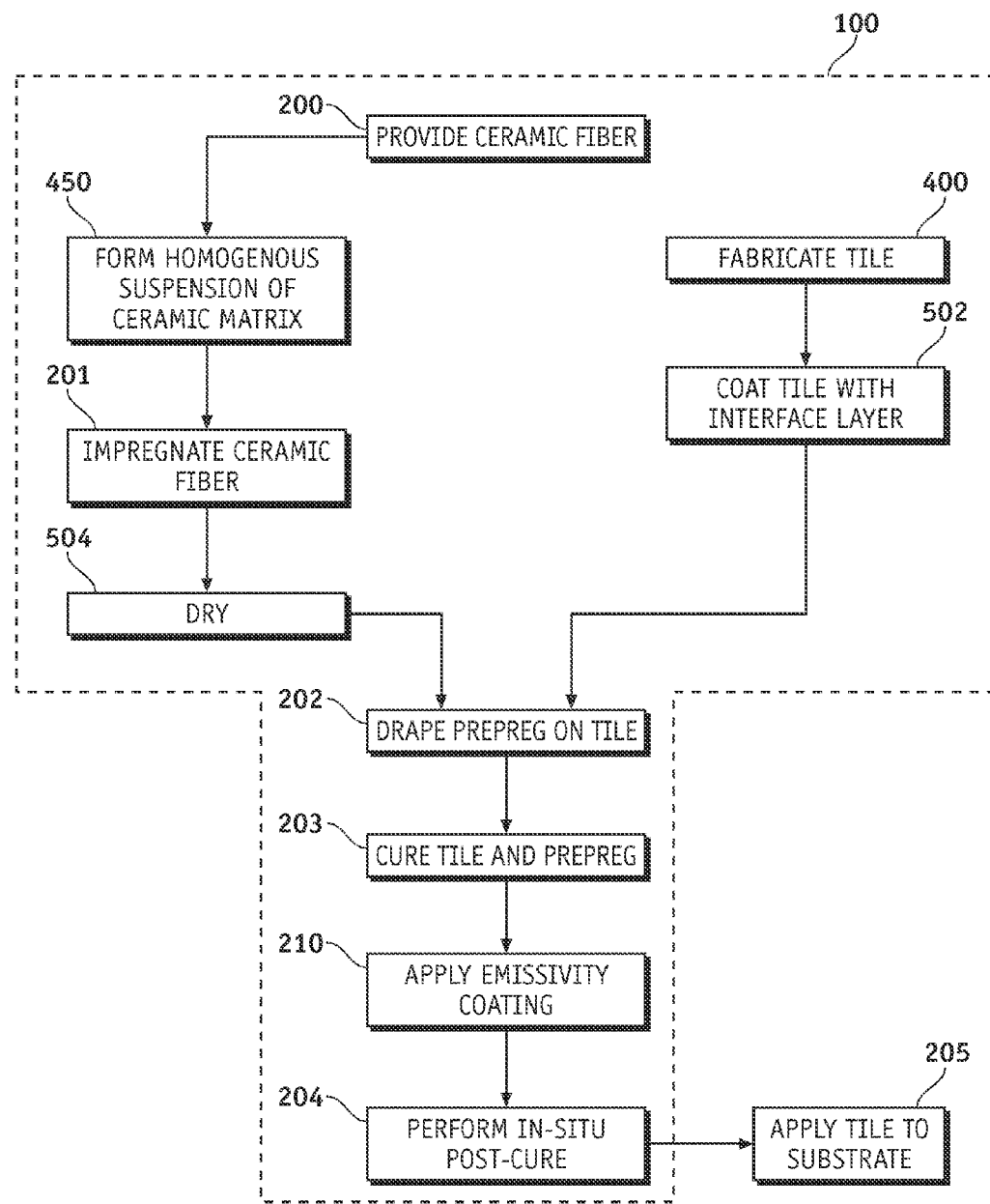
FIG. 3 is a flow chart illustrating a method for fabricating an insulation tile in accordance with an exemplary embodiment.

A method 100 for fabricating a thermal insulation assembly, such as thermal insulation assembly 10 of FIG. 1, is illustrated in FIGS. 2 and 3. Method 100 includes the step of fabricating tile 14 (step 400). Step 400 begins by providing a ceramic fiber insulation tile core billet 150, with any preparatory steps such as firing already performed (step 101). Fibrous type insulation billets are often found in the furnace insulation industry as well as the aerospace industry. As it is preferable to have a light-weight tile, rigid fiber insulation is an exemplary type of billet material for the present invention. Examples of rigid fiber insulation suitable for use include AETB insulation and BRI, which are standard high temperature materials for thermal protection assemblies on spacecraft such as the Space Shuttle. A number of processes are known for preparing such rigid fiber insulation. In one exemplary process of forming a rigid fiber insulation billet (step 400), illustrated in FIG. 4, the billet 150 is fabricated of a ceramic material by forming a mat of ceramic fibers (step 402) and then sintering the mat to leave porosity between the fibers (step 404). For example, in one known approach, silica fibers, aluminoborosilicate fibers, and alumina fibers are placed into a mold. A vacuum is drawn on one side of the mold to collapse the fibers into a mat, possibly with other additives captured inside the mat. The mat is heated to a temperature of about 1371° C. (about 2500° F.) to sinter the fibers into a solid ceramic material having a porosity therein. The extent and nature of the porosity can be controlled by the manufacturing technique. Other typical approaches for forming the ceramic insulation material include bonding the various types of fiber with glass-forming ceramic particulates or sol gel binders.

In another embodiment, the mat is impregnated with a silica or alumina aerogel to reduce the thermal conductivity of the billet 150 (step 406). In this regard, after the mat is sintered and machined into a desired shape, it is impregnated with nanoporous materials such as silica or alumina aerogel material. An exemplary method of impregnation includes the steps of preparing an aerogel solution, vacuum infiltrating the solution into the porous billet, and performing supercritical processing to form a dried aerogel material within the spaces between the ceramic fibers. A silica aerogel may be prepared from an alkoxysilane, such as TMOS (tetramethoxy silane, $Si(OCH_3)_4$) or TEOS (tetraethoxysilane, $Si(OCH_2CH_2)_4$) mixed with an alcohol, preferably methanol or ethanol, water, and a base catalyst such as ammonium hydroxide. The percentage of components is varied to obtain a desired density of aerogel. Typical percentages for the aerogel composition are about 5 wt % to about 25 wt % alkoxysilane, about 50 wt % to about 90 wt % alcohol, about 5 wt % to about 20 wt % water, and ammonium hydroxide dissolved in the water component at a concentration of about 0.01 to 10 moles per liter of water. An alumina aerogel, for example, may be prepared from aluminum tri-sec-butoxide, an alcohol, which is, for example, a mixture of ethanol and methanol, water, and an acid catalyst such as acetic acid. A typical mixture is composed of about 5 to 25 wt % aluminum tri-sec-butoxide, about 50 to 90 wt % alcohol, about 0.1 to 10 wt % deionized water, and about 1 to 10 wt % acetic acid. Once the aerogel is prepared, it is vacuum infiltrated into the porous ceramic substrate. The typical infiltration process includes vacuum bagging the mat to fully evacuate the mat and the vacuum bag, and then introducing the aerogel solution until the mat is filled. Once impregnated, the mat itself appears to accelerate the aerogel gellation step and no additional gellation or aging time is required. Instead, once gelled the impregnated ceramic material is placed in a supercritical reactor, the temperature and pressure are ramped up to about 329.4° C. (about 625° F.) and about 140 kg/cm (about 2000 psi) over about a 1-3 hour period and then, after thermal equilibrium is reached, the reactor is depressurized over about a 4 hour period. As used herein, a supercritical reactor is a reactor capable of maintaining a substance under supercritical conditions, i.e. at a temperature above which a gas cannot be liquified at any pressure.

Referring back to FIG. 2, once formed, the billet 150 next is machined to any shape that may be required for a particular application (step 102). The billet may be machined to virtually any size or shape, as long as the surfaces that are to be coated are sufficiently exposed for CMC overlay. Once the billet is machined on a rough scale, final details are provided to the billet through further machining to form tile 14 (step 103).

Referring back to FIGS. 2 and 3, in one exemplary embodiment, at any time before, during, or after process 400 above is performed, a wet oxide CMC facesheet is prepared by providing a ceramic fiber 250 (step 200), forming a homogeneous suspension of a mullite-alumina ceramic matrix 254 (step 450), and impregnating the ceramic fiber with the mullite-alumina ceramic matrix 254 (step 201). Examples of ceramic fibers suitable for use include 4-harness satin, 8-harness satin, or plain weave of oxide fibers such as Nextel® 312, Nextel® 550, Nextel® 610, Nextel® 620, Nextel® 650, and Nextel® 720 alumina-silica fibers available from 3M of St. Paul, Minn., Altex™ alumina fibers available from Sumitomo Chemical Co. of Japan, and Almax™ alumina fibers available from Mitsui Mining Company, Ltd. of Japan. Non-oxide fibers also may be used. Examples of non-oxide fibers include silicon carbide (SiC) fibers such as Nicalon™, CG, HiNicalon™ or Sylramic™ available from Nippon Carbon Company Ltd. of Japan, and Tyranno Fiber® (SA or ZMI) available from UBE Industries Ltd. of Japan. In one exemplary embodiment, the fibers for high-temperature use are Nextel 720 or Tyranno SA.

Figure 5:
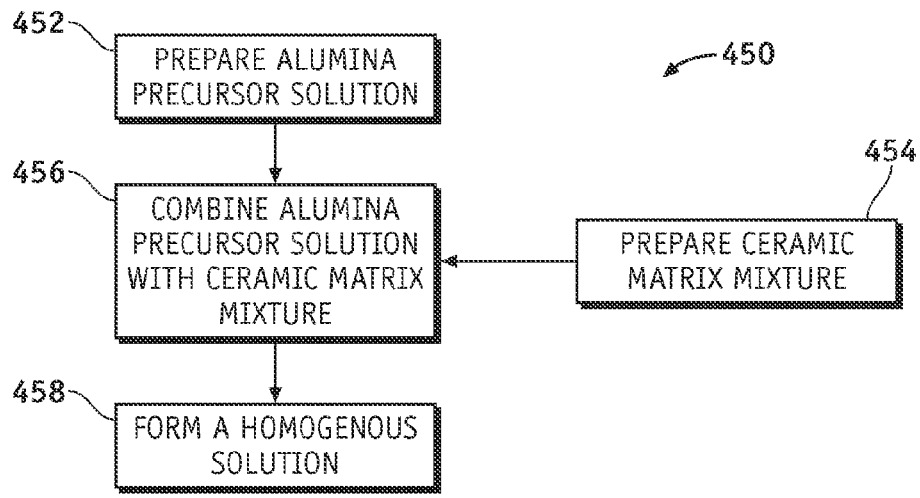
FIG. 5 is a flow chart illustrating a method for fabricating a thermal insulation assembly in accordance with an exemplary embodiment.

A method 450 of preparing a homogenous mullite-alumina ceramic matrix 254 in accordance with an exemplary embodiment is illustrated in FIG. 5. The method 450 includes the step of preparing an alumina precursor solution (step 452). In one embodiment for preparing the alumina precursor solution, about 50 to 500 g (about 1.8 to 17.6 ounces (oz)) aluminum chloride hexahydrate is dissolved into about 50 to 1500 g (about 1.8 to 52.9 oz) deionized (DI) water. The mixture is heated in a reaction vessel with a cooled reflux condenser to about 40-45° C. (about 104-113° F.). About 20 to 400 g (about 0.7 to 14.1 oz) of at least 99% purity aluminum powder of mesh size –40 to 325 is added to the solution. The temperature of the solution is maintained at about 65-75° C. (about 149-167° F.) for about 12 to 15 hours. The solution is filtered and the resulting alumina precursor solution is concentrated to adjust the density of the solution to about 0.5 to 5 grams per cubic centimeter ($gm/cm^3$) (about 8.2 to 82 grams/cubic inch ($g/in^3$)).

Method 450 also includes the step of preparing a ceramic matrix mixture (step 454). The ceramic matrix mixture comprises about 10 to 70 wt % mullite ($3Al_2O_3.2SiO_2$)-alumina powder mixture, up to about 25 wt % binder, up to about 20 wt % emissivity agents, as described below, and up to about 1 wt % antifoamer. In one embodiment, submicron alumina and submicron mullite powders are used. In the mullite-alumina powder mixture, the mullite/alumina ratio varies from about 5/95 to about 95/5. In an exemplary embodiment, the powder mixture has about 73.5 wt % mullite and about 26.5 wt % alumina. The binder is, for example, an organic binder such as polyvinylpyrrolidone (PVP) and the antifoamer is, for example, Dow Corning 1410 available from Dow Corning of Midland, Mich.

As noted above, in one exemplary embodiment, emissivity agents, such as encapsulated silicon carbide (SiC), silicon tetraboride ($SiB_4$), or silicon hexaboride ($SiB_6$) may be incorporated into the ceramic matrix to increase surface emissivity. Other emissivity agents such as molybdenum disilicide ($MoSi_2$) and aluminum phosphate containing carbon, such as, for example, Cerablak™ available from Applied Thin Films, Inc. of Evanston, Ill., may also be added to the ceramic matrix. In an exemplary embodiment, the emissivity agents have a particle size between about 1 to 50 microns.

The ceramic matrix mixture and the alumina precursor solution are combined to form the mullite-alumina ceramic matrix 254 (step 456). The mullite-alumina ceramic matrix then is made into a homogenous suspension by breaking up soft-powder agglomerates (step 458). Methods of creating a homogeneous suspension are well known in the art. Some examples include ball-milling, attrition milling, high-shear mixing, and sonic mixing. In one exemplary embodiment, the matrix is ball-milled with alumina media. In another exemplary embodiment, the matrix is ball-milled for 4 hours to produce a homogenous non-agglomerated suspension of mullite-alumina ceramic matrix. Although a method for making a mullite-alumina-based ceramic matrix has been described above, it will be understood that any suitable oxide-based ceramic matrix may be used.

Referring back to FIGS. 2 and 3, the ceramic fiber 250 then is impregnated with the ceramic matrix 254 to form a wet impregnated ceramic fiber assembly ("prepreg") 252 (step 201). The ceramic matrix can be impregnated into ceramic fiber cloths or tapes using any of the commonly used infiltrating methods to form prepreg 252. For complete and uniform infiltration, a doctor's blade or a pinched-roller set-up is used to form the prepreg 252. The prepreg 252 then is dried to develop a tack (step 504).

Before the prepreg is applied to the tile 14, the tile is coated with interface layer 18 described above (step 502). The interface layer is composed of submicron alumina powder that is mixed with mullite powder. The mullite-alumina powder is combined with an alumina precursor solution, such as the alumina precursor solution described above. The interface layer is coated onto the surface 20 of tile 14, such as by spraying or brushing, so that the layer penetrates into the surface 20 about 0.25 to 0.51 cm (about 0.1 to 0.2 inches) from surface 20. In an exemplary embodiment, the interface layer is applied at a concentration in the range of about 0.08 to 0.8 grams/square centimeter ($g/cm^2$) (about 0.5 to 5 grams/square inch ($g/in^2$)). In another exemplary embodiment, the layer is coated onto surface 20 at a concentration in the range of about 0.34 to about 0.51 $g/cm^2$ (about 2.2 to 3.3 $g/in^2$). The interface layer 18 is dried at a temperature in the range of about 425 to 650° C. (about 800 to 1200° F.) for about 1 to 3 hours until dry to the touch. In one exemplary embodiment, the interface layer 18 is dried at a temperature of about 537° C. (1000° F.) until dry to the touch.

The prepreg 252 then is draped on the tile to form a CMC facesheet 16 of desired thickness and shape (step 202). The prepreg 252 is draped onto at least one surface of the tile 14 and can be applied to all surfaces that will be exposed to adverse environmental conditions. Multiple prepreg plies may be applied to exposed surfaces of the tile to provide better damage resistance, while only a single ply or no ply may be applied to unexposed surfaces to minimize weight increase and cost. In one exemplary embodiment, the thermal protection assembly comprises four plies of prepreg 252. It will be noted that draping of a prepreg to the tile does not require tooling necessary to form a wrapped assembly of a predetermined shape. The prepreg 252 has sufficient tack to be draped onto or wrapped around a tile 14 of virtually any shape without the need for a molding apparatus, securing parts or assemblies, or the use of multiple parts to keep the wrapped tile intact, thus reducing cost. In fact, the prepreg 252 can be wrapped by hand and the wrapped fiber insulation tile will maintain its intended shape.

Figure 6:
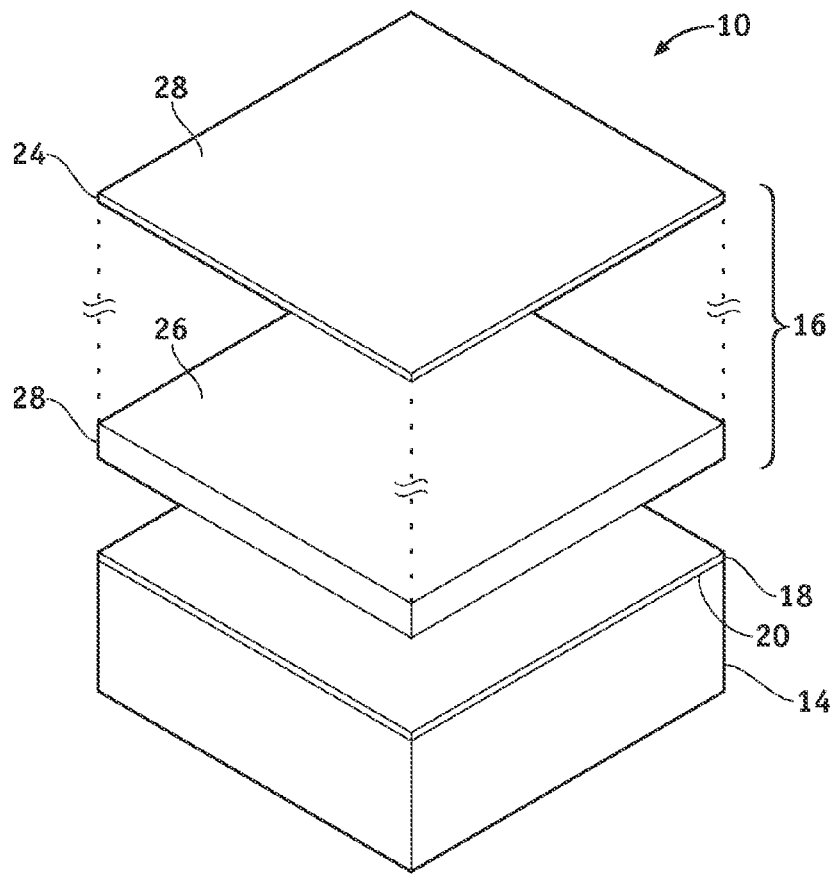
FIG. 6 is an exploded isometric view of a thermal insulation assembly in accordance with an exemplary embodiment.

A consideration when choosing an appropriate ceramic fiber for the CMC facesheet is that it has a coefficient of thermal expansion (CTE) that closely matches the CTE for the insulation material over which the CMC facesheet 16 is wrapped. If one of these components expands or shrinks too extensively during cure, or post cure, the cured article may crack during use. The article may crack in its entirety, although it is most common for the insulation to crack due to CTE mismatch or shrinkage of the ceramic fiber. Thus, in one exemplary embodiment, the CMC facesheet and the insulation tile have closely matched CTEs. For example, in one embodiment, a lower CTE non-oxide fiber such as Tyranno Fiber SA, which has a CTE of about $5 \times 10^{-6}$ cm/cm/C, may be used to form CMC facesheet 16. Commonly, however, while the tile 14 and the CMC facesheet 16 may have similar CTEs, the difference between the two CTEs may be enough to induce residual stresses within the assembly, making the assembly susceptible to cracking. In this regard, referring momentarily to FIG. 6, the CMC facesheet 16 may comprise multiple prepreg plies 28 formed of different ceramic fibers 250 with different CTEs. CMC facesheet 16 may comprises a first prepreg ply 26 that has a CTE that is similar to the CTE of tile 14. For example, if using a BRI tile, which typically has an in-plane CTE of about $2.6 \times 10^{-6}$ to $5 \times 10^{-6}$ cm/cm/C, the first prepreg ply 26 may be formed of a lower CTE aluminoborosilicate fiber, such as Nextel 312 fiber, which has a CTE closer to that of ceramic tile 14 (about $3 \times 10^{-6}$ cm/cm/C). However, Nextel 312 typically is stable up to temperatures of no more than about 982° C. (about 1800° F.). Accordingly, the first prepreg ply 26 is disposed as the inner-most ply, that is, the ply draped closes to tile 14 to serve as a CTE bridge between the tile and an outer prepreg ply 24. The outer prepreg ply 24 may have a higher CTE but produces a higher temperature-resistant assembly 10 capable of stability at temperatures above 1093° C. (2000° F.). The outer prepreg ply 24 may be formed from, for example, Nextel 720 (oxide fiber) or Tyranno SA (non-oxide SiC fiber). Nextel 720 fiber is able to withstand temperatures of 1316° C. (2400° F.) without substantial degradation. However, the CTE of Nextel 720 fibers (about $6 \times 10^{-6}$ cm/cm/C) is typically too high to substantially match the CTE of tile 14. Thus, by using prepreg plies 28 with varying CTEs, the CTE of the assembly can be raised from that of the tile 14 to that of the outermost prepreg ply by changing the type of fiber used in the plies. It will be appreciated that CMC facesheet 16 may comprise any number of prepreg plies 28 to form a CMC facesheet 16 with graded CTEs that can withstand temperatures above 1093° C. (2000° F.) and that any number of plies of the CMC facesheet 16 may have a first CTE, a second CTE, etc.

Referring back to FIGS. 2 and 3, the tile 14 and the prepreg ply or plies 252 are then cured, becoming rigid (step 203). Curing is performed by placing the wrapped tile into a vacuum bag and heating the tile at a temperature in the range of about 121 to 232° C. (about 250° F. to 450° F.), preferably about 176.7° C. (about 350° F.). Curing may be carried out with pressure of, for example, up to about 7 kg/cm$^2$ (about 100 psi), preferably about 1.4 kg/cm$^2$ to about 3.5 kg/cm$^2$ (about 20 to 50 psi), or without pressure, by using a press and/or an oven or heater blanket in a vacuum bag. During curing, the alumina precursor begins to bond the mullite and alumina powders together. Curing removes volatile components from the prepreg ply, helps drape the prepreg ply onto the tile, and causes the matrix to become rigid. Selection of the process for drying and curing depends on the size and shape of the tile 14. In a further embodiment, the steps of impregnating, drying and curing can be repeated to achieve the desired density of CMC facesheet 16.

In an optional embodiment of the invention, an emissivity coating 22 can be applied to the cured tile 14 (step 210). In accordance with one exemplary embodiment, a high emissivity powder is suspended in a solution and is subsequently brushed, sprayed, or otherwise applied to the surface of the post-cured CMC facesheet 16 or a post-fired CMC facesheet 16, as described in more detail below. The emissivity powder may comprise SiC, SiB$_4$, MoSi$_2$, or SiB$_6$ and is milled to a particle size of no more than about 50 microns. Colloidal silica is added to the powder and the mixture is combined in an alcohol such as, for example, ethanol. An optional second emissivity powder, such as any of the four listed above or, for example, aluminum phosphate containing carbon such as Cerablak™ available from Applied Thin Films, Inc. of Evanston, Ill., may be added to the solution. The solution is milled to obtain a particle size of no more than about 50 microns and a thickening agent is added. The thickening agent may be, for example, methylcellulose ether (known as Methocel A4M) available from Dow Chemical Company of Midland, Mich. A resulting emissivity solution 30 is applied, such as by spraying, brushing, or rolling, to the CMC facesheet 16 and then is fired at temperatures of about 1150 to about 1200° C. (about 2100 to about 2200° F.) for about 1 hour.

After curing, the tile, with or without emissivity coating 22, then is subjected to a "in-situ" post cure ("firing") (step 204). The "in-situ" firing both sinters the alumina-mullite matrix, forming stronger bonds between the alumina and mullite powders and causing the CMC facesheet 16 to intimately bond with the tile 14. The in-situ firing can be performed by removing the tile from the vacuum bag, if not already removed, and firing the tile at a free-standing position at a temperature in the range of about 1093 to 1371° C. (about 2000 to 2500° F.), preferably about 1204° C. (about 2200° F.). The tile is fired for about 1 to 3 hours, preferably about 2 hours, to fully sinter the CMC facesheet 16 and to form a bond between the facesheet 16 and the tile 14. Accordingly, in contrast to previous methods of fabricating insulation assemblies, the method 100 can fabricate high temperature-resistant thermal insulation assemblies 10 in a relatively short period, such as, for example, three days compared to two weeks required for prior art insulation assemblies.

After the in-situ firing, method 100 may be followed by affixing the thermal insulation assembly 10 to a substrate 32, such as portion or region of a space vehicle, an aircraft, a turbine, or any other instrument that is exposed to extreme environments (step 205). The assembly 10 may be affixed to the substrate 32 by, for example, bonding the assembly 10 to the substrate 32 using an appropriate adhesive. In another embodiment, the assembly 10 may be affixed to the substrate 32 by mechanical attachment, such as with the use of screws, clamps, rivets, or the like. It will be appreciated that any other suitable method may be used to affix assembly 10 to substrate 32.

The foregoing and other aspects of the teaching may be better understood in connection with the following examples, which are presented for purposes of illustration and not by way of limitation.

EXAMPLE 1

Prepare An Alumina Precursor

The alumina precursor solution may be made by dissolving 202.80 g (about 7.2 oz) of reagent grade aluminum chloride hexahydrate ($AlCl_3.6H_2O$) into 800 g (about 28.2 oz) DI water. The solution is heated in a reaction vessel with a cooled reflux condenser to about 40-45° C. (about 104-113° F.). Approximately 113.28 g (about 4 oz) of aluminum powder of −40 to +325 mesh with at least 99.8% purity is slowly added to the solution. As the aluminum powder reacts, an exothermic reaction occurs. After reaction is complete, the solution is kept at about 65-75° C. (about 149-167° F.) for about 12 to 15 hours. The solution is filtered and the concentration is adjusted to a density of about 1.3 to 2.0 $g/cm^3$ (about 21.3 to 32.8 $g/in^3$).

EXAMPLE 2

Prepare Mullite-Alumina Ceramic Matrix

To make a ceramic matrix for the CMC prepreg process, the alumina precursor solution at a density of 0.5 to 5.0 $g/cm^3$ (about 8.2 to 82 $g/in^3$), preferably 1.3 to 2.0 $g/cm^3$ (about 21.3 to 32.8 $g/in^3$), is combined with alumina powder (AKP-50 from Sumitomo Chemical Co. Ltd. of Japan) and mullite powder (KM101 from Kyoritsu Ceramic Materials Co. Ltd. of Japan) at a concentration of 10 to 70 wt % powder, preferably 50 wt %. The mullite-to-alumina powder ratio varies from 5/95 to 95/5, preferably 73.5 wt % mullite and 26.5 wt % alumina. This mixture is combined with 0 to 25%, preferably 15 wt % PVP (from Sigma Aldrich of St. Louis, Mo.), 0 to 20% emissivity agent (preferably 4-8 wt % SiC), and 0 to 1 wt % antifoamer (Dow Corning 1410 from Dow Corning of Midland, Mich.). The mixture then is ball milled for 4 hours.

EXAMPLE 3

Prepare Mullite-Alumina Ceramic Matrix

The mullite-alumina ceramic matrix is formed by combining 364.8 g (12.9 oz) of alumina precursor solution (density about 1.3 $g/cm^3$ (about 21.3 $g/in^3$)) with 111.8 g (about 4 oz) of alumina powder (AKP-50), 316.8 g (about 11.2 oz) of mullite powder (KM101), 66.6 g (about 2.3 oz) PVP, 40 g (about 1.4 oz) SiC powder, 140.0 g (about 4.9 oz) DI water and 5 drops of antifoam (Dow Corning 1410). The mixture then is ball milled for 4 hours.

EXAMPLE 4

Prepare Mullite-Alumina Ceramic Matrix

The mullite-alumina ceramic matrix is formed by combining 137 g (about 4.8 oz) alumina precursor solution (density about 1.3 $g/cm^3$ (about 21.3 $g/in^3$)) with 42 g (about 1.5 oz) alumina powder (AKP-50), 119 g (about 4.2 oz) mullite powder (KM101) and 25 g (about 0.9 oz) PVP. The mixture is then ball milled for 4 hours.

EXAMPLE 5

Prepare Prepreg

The mullite-alumina ceramic matrix is impregnated into a woven oxide cloth (4 or 8 harness satin) such as Nextel 312, Nextel 440, Nextel 550, Nextel 720, Nextel 610 or a woven non-oxide cloth such as Tyranno SA or Nicalon CG. The impregnation of the cloth is done using a doctor blade setup producing a wet prepreg.

Accordingly, thermal insulation assemblies have been provided. The thermal insulation assemblies have smooth and durable surfaces and can withstand temperatures of greater than about 1200° C. (about 2200° F.) without becoming substantially embrittled. In addition, low cost methods for fabricating such thermal insulation assemblies also have been provided. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A thermal insulation assembly, comprising:
   a ceramic tile having a surface coated with a slurry consisting essentially of alumina powder, mullite powder, and an alumina precursor solution; and
   a ceramic matrix composite facesheet disposed on the coated surface of the ceramic tile, the ceramic matrix composite facesheet comprising a first ply of a ceramic fiber impregnated with a ceramic matrix.

2. The thermal insulation assembly of claim 1, wherein the ceramic tile comprises an alumina aerogel or a silica aerogel.

3. The thermal insulation assembly of claim 1, wherein the ceramic fiber comprises an oxide fiber selected from the group consisting of silica fibers, quartz fibers, and alumina fibers.

4. The thermal insulation assembly of claim 1, wherein the ceramic fiber comprises a non-oxide fiber.

5. The thermal insulatin assembly of claim 1, wherein the ceramic matrix comprises mullite and alumina.

6. The thermal insulation assembly of claim 1, wherein the ceramic matrix further comprises an emissivity agent.

7. The thermal insulation assembly of claim 1, wherein the ceramic matrix composite facesheet comprises a second ply of a ceramic fiber impregnated with the ceramic matrix.

8. The thermal insulation assembly of claim 7, wherein the first ply has a first coefficient of thermal expansion (CTE) and the second ply has a second CTE that is different from the first CTE.

9. The thermal insulation assembly of claim 8, wherein the first ply is disposed proximate to the ceramic tile and the second ply is disposed remote from the ceramic tile relative to the first ply and the first CTE is closer in value to a CTE of the ceramic tile than the second CTE.

10. The thermal insulation assembly of claim 1, further comprising an emissivity coating disposed on the ceramic matrix composite facesheet.

11. A method for fabricating a thermal insulation assembly, the method comprising the steps of:
provideing a machined ceramic tile having a surface;
coating the surface of the ceramic tile with a slurry consisting essentially of alumina powder, mullite powder, and an alumina precursor solution;
preparing a first ceramic matrix composite ply;
applying the first ceramic matrix composite ply overlying the coated surface of the ceramic tile; and
curing the first ceramic matrix composite ply.

12. The method of claim 11, wherein the step of preparing comprises the step of preparing a first mullite-alumina-based ceramic matrix composite ply.

13. The method of claim 12, wherein the step of preparing a first mullite-alumina-based ceramic matrix composite ply comprises the steps of:
providing a ceramic fiber;
preparing a mullite-alumina-based ceramic matrix;
impregnating the ceramic fiber with the mullite-alumina-based ceramic matrix.

14. The method of claim 13, wherein the step of providing a ceramic fiber comprises the steps of providing an oxide fiber.

15. The method of claim 13, wherein the step of preparing a mullite-alumina-based ceramic matrix comprises the steps of:
preparing an alumina precursor solution;
forming a mullite-alumina-based ceramic matrix mixture;
combining the alumina precursor solution and the mullite-alumina-based ceramic matrix mixture; and
creating a homogeneous ceramic matrix from the alumina precursor solution/mullite-alumina-based ceramic matrix mixture combination.

16. The method of claim 15, further comprising the step of incorporating an emissivity agent into the alumina precursor solution/mullite-alumina-based ceramic matrix mixture combination.

17. The method of claim 11, further comprising, after the step of curing, the step of in-situ firing the first ceramic matrix composite ply.

18. The method of claim 11, further comprising the step of disposing an emissivity coating onto the first ceramic matrix composite ply, wherein the step of disposing is performed after the step of curing.

19. The method of claim 11, further comprising the steps of:
preparing a second ceramic matrix composite ply; and
applying the second ceramic matrix composite ply overlying the first ceramic matrix composite ply;
wherein the first ceramic matrix composite ply has a coefficient of thermal expansion that is different from a coefficient of thermal expansion of the second ceramic matrix composite ply.

* * * * *